United States Patent
Svenkeson et al.

(10) Patent No.: US 6,665,761 B1
(45) Date of Patent: Dec. 16, 2003

(54) METHOD AND APPARATUS FOR ROUTING INTERRUPTS IN A CLUSTERED MULTIPROCESSOR SYSTEM

(75) Inventors: Penny L. Svenkeson, Forest Lake, MN (US); Robert J. Gulick, Glenmoore, PA (US); Doug E. Morrissey, Allentown, PA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/362,389

(22) Filed: Jul. 28, 1999

(51) Int. Cl.[7] .......................... G06F 13/32; G06F 13/24
(52) U.S. Cl. ...................... 710/268; 710/260; 710/266; 710/269; 710/316
(58) Field of Search ........................... 709/206; 710/260, 710/266, 268, 269, 316

(56) References Cited

U.S. PATENT DOCUMENTS

| | | | |
|---|---|---|---|
| 3,641,505 A | 2/1972 | Artz et al. | 340/172.5 |
| 3,768,074 A | 10/1973 | Sharp et al. | 340/172.5 |
| 3,812,469 A | 5/1974 | Hauck et al. | 340/172.5 |
| 4,000,485 A | 12/1976 | Barlow et al. | 340/172.5 |
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |

(List continued on next page.)

FOREIGN PATENT DOCUMENTS

| | | |
|---|---|---|
| EP | 0 752 677 A1 | 1/1997 |
| WO | WO 95/25306 | 9/1995 |
| WO | WO 96/35172 | 11/1996 |

OTHER PUBLICATIONS

US 5,881,293, 3/1999, Olarig et al. (withdrawn)
Intel Multiprocessor Specification, Version 1.4, May 1997.*
Burroughs Corporation, "B68000 Multiprocessor Systems", Aug. 21, 1979, B 6000 Series System Notes, Mark III.1 Release, Sep. 1979, pp. 53–84.
"Exemplar System Architecture", http://www.hp/com/wsg/products/servers/exemplar/sx–class/exemplar.htm, Downloaded Feb. 12, 1998. (Date of publication unknown).
Stenstrom, et al., "Boosting the Performance of Shared Memory Multiprocessors", Computer, Jul. 1997, pp. 63–70.
M.S. Yousif, et al., "Cache Coherence in Multiprocessors: A Survey", Advances in Computers, vol. 10, 1995, pp. 127–179.
Fred R. Goldstein "Congestion Control in Frame Relay Networks Using Explicit Binary Feedback", Conference Proceedings, Mar. 27–30, 1991, pp. 558–564.

(List continued on next page.)

Primary Examiner—David Wiley
Assistant Examiner—George Neurauter
(74) Attorney, Agent, or Firm—Charles A. Johnson; Mark T. Starr; Crompton, Seager & Tufte, LLC

(57) ABSTRACT

A method and apparatus for increasing the routing bandwidth of interrupts between cluster manager devices in a clustered multiprocessor system is disclosed. This is accomplished by providing special cluster manager devices that can convert "N" serial messages received from a local APIC to "M" parallel messages, wherein M is less than N. The special cluster manager device then transfers the "M" parallel messages to a receiving cluster manager device. The receiving cluster manager device converts the "M" parallel messages into the original "N" serial messages, and sends the "N" serial messages to the appropriate local APIC within the receiving cluster.

17 Claims, 12 Drawing Sheets

U.S. PATENT DOCUMENTS

| | | | |
|---|---|---|---|
| 4,392,196 A | 7/1983 | Glenn et al. | 364/200 |
| 4,441,155 A | 4/1984 | Fletcher et al. | 364/200 |
| 4,464,717 A | 8/1984 | Keeley et al. | 364/200 |
| 4,466,059 A | 8/1984 | Bastian et al. | 364/200 |
| 4,488,217 A | 12/1984 | Binder et al. | 364/200 |
| 4,562,536 A | 12/1985 | Keeley et al. | 364/200 |
| 4,564,903 A | 1/1986 | Guyette et al. | 364/300 |
| 4,586,133 A | 4/1986 | Steckler | 364/200 |
| 4,667,288 A | 5/1987 | Keeley et al. | 364/200 |
| 4,686,621 A | 8/1987 | Keeley et al. | 364/200 |
| 4,843,541 A | 6/1989 | Bean et al. | 364/200 |
| 4,875,155 A | 10/1989 | Iskiyan et al. | 364/200 |
| 4,967,414 A | 10/1990 | Lusch et al. | 371/51.1 |
| 5,016,167 A | 5/1991 | Nguyen et al. | 364/200 |
| 5,047,920 A | 9/1991 | Funabashi | 364/200 |
| 5,060,136 A | 10/1991 | Furney et al. | 364/200 |
| 5,067,071 A | 11/1991 | Schanin et al. | 395/275 |
| 5,142,676 A | 8/1992 | Fried et al. | 395/425 |
| 5,237,670 A | 8/1993 | Wakerly | 395/425 |
| 5,251,308 A | 10/1993 | Frank et al. | 395/425 |
| 5,257,361 A | 10/1993 | Doi et al. | 395/425 |
| 5,261,059 A * | 11/1993 | Hedberg et al. | 710/317 |
| 5,276,884 A | 1/1994 | Mohan et al. | 395/700 |
| 5,327,538 A | 7/1994 | Hamaguchi et al. | 395/325 |
| 5,392,416 A | 2/1995 | Doi et al. | 395/425 |
| 5,408,629 A | 4/1995 | Tsuchiva et al. | 395/425 |
| 5,465,336 A | 11/1995 | Imai et al. | 395/375 |
| 5,490,280 A | 2/1996 | Gupta et al. | 395/800 |
| 5,497,472 A | 3/1996 | Yamamoto et al. | 395/427 |
| 5,499,354 A | 3/1996 | Aschoff et al. | 395/456 |
| 5,504,874 A | 4/1996 | Galles et al. | 395/472 |
| 5,537,569 A | 7/1996 | Masubuchi | 395/448 |
| 5,568,633 A | 10/1996 | Boudou et al. | 395/468 |
| 5,581,725 A | 12/1996 | Nakayama | 395/449 |
| 5,619,706 A * | 4/1997 | Young | 710/111 |
| 5,717,897 A | 2/1998 | McCrory | 395/468 |
| 5,717,942 A | 2/1998 | Haupt et al. | 395/800 |
| 5,721,828 A * | 2/1998 | Frisch | 709/216 |
| 5,745,772 A * | 4/1998 | Klein | 710/266 |
| 5,832,279 A * | 11/1998 | Rostoker et al. | 710/266 |
| 5,842,026 A * | 11/1998 | Wong-Chan et al. | 370/242 |
| 5,860,002 A | 1/1999 | Huang | 395/652 |
| 5,867,658 A | 2/1999 | Lee | 395/200.52 |
| 5,867,702 A | 2/1999 | Lee | 395/651 |
| 5,892,956 A * | 4/1999 | Qureshi et al. | 710/260 |
| 6,247,091 B1 * | 6/2001 | Lovett | 370/402 |
| 6,295,573 B1 * | 9/2001 | Bailey et al. | 710/260 |
| 6,363,452 B1 * | 3/2002 | Lach | 710/316 |
| 6,470,408 B1 * | 10/2002 | Morrison et al. | 710/268 |

OTHER PUBLICATIONS

Intel Corporation, "Intel Architecture Software Developer's Manual", vol. 3, System Programming Guide, Chapters 5 and 7, 1997.

Intel Corporation, "MultiProcessor Specification", version 1.4, May 1997.

PCI Special Interest Group, PCT Local Bus Specification, revision 21, Chapter 1–3 and 6, Jun. 1, 1995.

IBM Technical Disclosure Bulletin, "Compact Global Table for Management of Multiple Caches", vol. 32, No. 7, Dec. 1, 1989, pp. 322–324.

Stenstrom, et al., "Trends in Shared Memory Multiprocessing", Computer, Dec. 1997, pp. 44–50.

* cited by examiner

| Cycle | Bit1 | Bit0 | Short Message (21 Cycles) |
|---|---|---|---|
| 1 | 0 | 1 | 0 1 = normal |
| 2 | ArbID3 | 0 | Arbitration ID bits 3 through 0 |
| 3 | ArbID2 | 0 | |
| 4 | ArbID1 | 0 | |
| 5 | ArbID0 | 0 | |
| 6 | DM | M2 | DM = Destination Mode |
| 7 | M1 | M0 | M2-M0 = Delivery mode |
| 8 | L | TM | L = Level, TM = Trigger Mode |
| 9 | V7 | V6 | V7-V0 = Interrupt Vector |
| 10 | V5 | V4 | |
| 11 | V3 | V2 | |
| 12 | V1 | V0 | |
| 13 | D7 | D6 | D7-D0 = Destination |
| 14 | D5 | D4 | |
| 15 | D3 | D2 | |
| 16 | D1 | D0 | |
| 17 | C | C | Checksum for cycles 6-16 |
| 18 | 0 | 0 | |
| 19 | A | A | Status cycle 0 |
| 20 | A1 | A1 | Status cycle 1 |
| 21 | 0 | 0 | Idle |

FIG. 5

| | | | M_REQ (Message To MSU) | | | | | | | | | | | | | | | | | MT Bus Only | | |
|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| FMT=0 | R_BUS(S) | TLC(S) | R_BUS | TLC | BCAST | QD | DRSP | DP | D_FLG | | MWEQ[3:0] | | | Rsvd | DP=1 | | | CMD[4:0]=10000 | | | D_MSU[1:0] | |
| P_BUS(S) | P_BUS | BRFL=1 | | WID | | SRC_POD | | | | | | | | Rsvd | | | | | | | | Rsvd |
| | | | | | | | | | | | | | | | | | | | | | Cycle 1 | Cycle 2 |

FIG. 8

Interrupt Assert/De-assert (Directed and Broadcast)

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| W0 | Opcode | | | | SrcEntity# | | | | SrcWID | | | | Reserved | | | Lk | RP | ReqA[4:0] | | | | AP | | Address[43:35]=0 | | | | | | | | |
| W1 | Address[34:3] | | | | | | | | | | | | | | | | | | | | | | | | | | | | | | | |
| W2 | Reserved | | | | | | | | | | | | | | | | RP | ReqB[4:0] | | | | AP | | Address[43:35]=0 | | | | | | | | |
| W3 | Adr[34:32] | | | Attrib[7:0] | | | | | | | | DID[7:0]=0 | | | | | | | | | BE[7:0] | | | | | | | | EXF[4:0]=0 | | | |
| W4 | Reserved | | | | | | | | | | | | | | | | | | | Tm | Lv | Rsv | Dm | Mode | | | | Vector | | | | |
| W5:W7 | Reserved (field must be supplied with good parity) | | | | | | | | | | | | | | | | | | | | | | | | | | | | | | | |

TCM Slice#0

Notes: Italic fields are 0; Bold fields are non-0 constants, Address[34:3] contains 34:32 =0, 31:20= APIC Base (MIP);
19:12 - DestID(table); 11:4 Dest EID(table); 3 - MODE(table)

FIG. 9

| | M_RESPONSE (INT Assert, INT De-Assert (directed)) | | | | | | |
|---|---|---|---|---|---|---|---|
| | 6 | 5 | 4 | 3 | 2 | 1 | 0 |
| Cycle 1 | D_FLG=0 | DP=1 | DRSP=0 | QD=1 | BCAST=0 | TLC=1 | R_BUS |
| Cycle 2 | SRC_POD | | | WD | | BRFL=1 | P_BUS |

FIG. 10A

| | M_RESPONSE (INT Assert (broadcast)) | | | | | | |
|---|---|---|---|---|---|---|---|
| | 6 | 5 | 4 | 3 | 2 | 1 | 0 |
| Cycle 1 | D_FLG=0 | DP=1 | DRSP=0 | QD=1 | BCAST=1 | BMT=1 | BIO=0 |
| Cycle 2 | SRC_POD | | | WD | | BRFL=1 | Rsvd |

FIG. 10B

| | |
|---|---|
| Brfi | Bus Reflective Format Indicator: when set the associated data packet contains information that reflects the processor bus. |
| D_flag | Data for a coherent memory request flag- always 0 (not used) for messages |
| DP | Data Present: when set indicates that there is a valid data packet associated with this message |
| Drsp | Data Response: when set indicates that this message is a response to a previously issued request. This is only set for memory mapped operations, not interrupts. |
| Bcast | Broadcast indicator: when set indicates that this message is to be broadcast to agents within the partition (agents having the same window ID). |
| Tlc/Bmt | If (Bcast=0) then this bit represents Tlc: the requestor bus type (MIO/MT)<br>  If (Tlc=0) then this message is a response for an MIO requestor<br>  Else this message is a response for the specified MT (Tlc) requestor<br>Else (Bcast=1) this bit represents Bmt:<br>  If (Bmt=0) then this message is not broadcast to MT Bus agents (SubPODs)<br>  Else this message is to be delivered to all MT Bus agents in the partition. |
| Rbus/Bio | If (Bcast=0) then this bit represents Rbus: which requestor bus (of the TLC or MIO) behind the TCM this message is for.<br>  If (Tlc=0) and (Rbus=0) the destination agent => MIO Bus agent0 (DIB0)<br>  Elsif (Tlc=0) and (Rbus=1) the destination agent => MIO Bus agent1 (DIB1) [not used]<br>  Elsif (Tlc=1) and (Rbus=0) the destination agent => MT Bus agent (SubPOD0)<br>  Elsif (Tlc=1) and (Rbus=1) the destination agent => MT Bus agent (SubPOD1)<br>Else (Bcast=1) then this bit represents Bio:<br>  If (Bio=0) then this message is not broadcast to MIO Bus agents (DIBs)<br>  Else this message is to be delivered to all MIO Bus agents in the partition. |

FIG. 11

METHOD AND APPARATUS FOR ROUTING INTERRUPTS IN A CLUSTERED MULTIPROCESSOR SYSTEM

CROSS REFERENCE TO CO-PENDING APPLICATIONS

The present application is related to U.S. patent application Ser. No. 09/362,388 filed Jul. 28, 1999, entitled "Method And Apparatus For Initiating Execution Of An Application Processor In A Clustered Multiprocessor System"; U.S. patent application Ser. No. 09/215,424, filed Dec. 18, 1997, entitled "Computer System and Method for Operating Multiple Operating Systems in Different Partitions of the Computer System and for Allowing the Different Partitions to Communicate with one Another Through Shared Memory"; U.S. patent application Ser. No. 09/215,408, filed Dec. 18, 1998, entitled "A Memory Address Translation System and Method for a Memory Having Multiple Storage Units"; U.S. patent application Ser. No. 08/965,004, filed Nov. 5, 1997, entitled "A Directory-Based Cache Coherency System"; U.S. patent application Ser. No. 08/964,606, filed Nov. 5, 1997, entitled "Message Flow Protocol for Avoiding Deadlocks"; U.S. patent application Ser. No. 09/001,588, filed Dec. 31, 1997, entitled "High-Speed Memory Storage Unit for a Multiprocessor System Having Integrated Directory and Data Storage Subsystems", all of which are assigned to the assignee of the present invention and all of which are incorporated herein by reference.

TRADEMARK NOTICES

Unix is a registered trademark of The Open Group. SCO and Unixware are registered trademarks of The Santa Cruz Operation, Inc. Microsoft, Window, Window NT and/or other Microsoft products referenced herein are either trademarks or registered trademarks of Microsoft Corporation. Intel, Pentium, Pentium II Xeon, Pentium III Xeon, Merced and/or other Intel products referenced herein are either trademarks or registered trademarks of Intel Corporation.

TECHNICAL FIELD OF THE INVENTION

This invention relates to multiprocessing data processing systems, and more particularly to symmetrical multiprocessor data processing systems that use a clustered multiprocessor architecture. More specifically, the present invention relates to methods and apparatus for routing interrupts within a clustered multiprocessor system.

BACKGROUND OF THE INVENTION

Systems having multiple but coordinated processors were first developed and used in the context of mainframe computer systems. More recently, however, interest in multiprocessor systems has increased because of the relatively low cost and high performance of many microprocessors, with the objective of replicating mainframe performance through the parallel use of multiple microprocessors.

A variety of architectures have been developed including a symmetrical multiprocessing ("SMP") architecture, which is used in many of today's workstation and server markets. In SMP systems, the processors have symmetrical access to all system resources such as memory, mass storage and I/O.

The operating system typically handles the assignment and coordination of tasks between the processors. Preferably the operating system distributes the workload relatively evenly among all available processors. Accordingly, the performance of many SMP systems may increase, at least theoretically, as more processor units are added. This highly sought-after design goal is called scalability.

One of the most significant design challenges in many multiprocessor systems is the routing and processing of interrupts. An interrupt may generally be described as an event that indicates that a certain condition exists somewhere in the system that requires the attention of at least one processor. The action taken by a processor in response to an interrupt is commonly referred to as the "servicing" or "handling" of the interrupt.

In some multiprocessor systems, a central interrupt controller is provided for helping to route the interrupts from an interrupt source to an interrupt destination. In other systems, the interrupt control function is distributed throughout the system. In a distributed interrupt control architecture, one or more global interrupt controllers assumes global, or system-level, functions such as, for example, I/O interrupt routing. A number of local interrupt controllers, each of which is associated with a corresponding processing unit, controls local functions such as, for example, inter-processor interrupts. Both classes of interrupt controllers typically communicate over a common interrupt bus, and are collectively responsible for delivering interrupts from an interrupt source to an interrupt destination within the system.

The Intel Corporation published a Multiprocessor (MP) specification (version 1.4) outlining the basic architecture of a standard multiprocessor system that uses Intel brand processors. Complying with the Intel Multiprocessor (MP) specification may be desirable, particularly when using Intel brand processors. According to the Intel Multiprocessor (MP) Specification (version 1.4), interrupts are routed using one or more Intel Advanced Programmable Interrupt Controllers (APIC). The APICs are configured into a distributed interrupt control architecture, as described above, where the interrupt control function is distributed between a number of local APIC and I/O APIC units. The local and I/O APIC units communicate over a bus called an Interrupt Controller Communications (ICC) bus. There is one local APIC per processor and, depending on the total number of interrupt lines in an Intel MP compliant system, one or more I/O APICs. The APICs may be discrete components separate from the processors, or integrated with the processors.

The destination of an interrupt can be one, all, or a subset of the processors in the Intel MP compliant system. The sender specifies the destination of an interrupt in one of two destination modes: physical destination mode or logical destination mode. In physical destination mode, the destination processor is identified by a local APIC ID. The local APIC ID is then compared to the local APIC's actual physical ID, which is stored in a local APIC ID register within the local APIC. The local APIC ID register is loaded at power up by sampling configuration data that is driven onto pins of the processor. For the Intel P6 family processors, pins A11# and A12# and pins BR0# through BR3# are sampled. Up to 15 local APICs can be individually addressed in the physical destination mode.

The logical destination mode can be used to increase the number of APICs that can be individually addressed by the system. In the logical destination mode, message destinations are identified using an 8-bit message destination address (MDA). The MDA is compared against the 8-bit logical APIC ID field of the APIC logical destination register (LDR).

A Destination Format Register (DFR) is used to define the interpretation of the logical destination information. The DFR register can be programmed for a flat model or a cluster model interrupt delivery mode. In the flat model delivery mode, bits 28 through 31 of the DFR are programmed to 1111. The MDA is then interpreted as a decoded address. This delivery mode allows the specification of arbitrary groups of local APICs by simply setting each APIC's corresponding bit to 1 in the corresponding LDR. Broadcast to all APICs is achieved by setting all 8 bits of the MDA to one. As can be seen, the flat model only allows up to 8 local APICs to coexist in the system.

For the cluster model delivery mode, the DFR bits 28 through 31 are programmed to 0000. In this delivery mode, there are two basic connection schemes: a flat cluster scheme and a hierarchical cluster scheme. In the flat cluster scheme, it is assumed that all clusters are connected to a single APIC bus (e.g., ICC bus). Bits 28 through 31 of the MDA contain the encoded address of the destination cluster. These bits are compared with bits 28 through 31 of the LDR to determine if the local APIC is part of the cluster. Bits 24 through 27 of the MDA are compared with Bits 24 through 27 of the LDR to identify individual local APIC unit within the selected cluster. Arbitrary sets of processors within a cluster can be specified by writing the target cluster address in bits 28 through 31 of the MDA and setting selected bits in bits 24 through 27 of the MDA, corresponding to the chosen members of the cluster In this mode, 15 clusters (with cluster addresses of 0 through 14) each having 4 processors can be specified in a message. The APIC arbitration ID, however, only supports 15 agents, and hence the total number of processors supported in the flat cluster mode is limited to 15.

The hierarchical cluster scheme allows an arbitrary hierarchical cluster network to be created by connecting different flat clusters via independent APIC buses. This scheme requires a special cluster manager device within each cluster to handle the messages that are passed between clusters. The special cluster manager devices are not part of the local or I/O APIC units. Rather, they are separately provided. In the hierarchical cluster scheme, one cluster may contain up to 4 agents. Thus, when using 15 special cluster managers connected via a single APIC bus (e.g., ICC bus), each having 4 agents, a network of up to 60 APIC agents can be formed.

A limitation of the hierarchical cluster scheme as defined in the Intel Multiprocessor Specification is that a single independent APIC bus (e.g., ICC bus) may not provide sufficient bandwidth to effectively service all inter-cluster interrupts, particularly in larger systems that includes, for example, up to 15 special cluster manager devices connected to the bus. Conventional APIC devices include a communication protocol for communication over the ICC. This protocol is relatively serial in nature. For example, APIC devices typically send three different types of messages over the ICC bus: EOI type messages which consume 14 ICC bus cycles; short type messages which consume 21 ICC bus cycles; and non-focused lowest priority type messages which consume up to 34 ICC bus cycles.

If a single independent ICC bus is used to connect the various cluster manager devices, as suggested by the Intel MP specification, the independent ICC bus must handle all inter-cluster interrupts. Because an ICC bus is relatively serial in nature, the ICC bus may become a significant bottleneck for inter-cluster interrupts, thereby slowing system performance. To help reduce this bottleneck, multiple hierarchical ICC buses could be used to connect a number of hierarchically arranged special cluster manager devices. However, this approach would require significant overhead including additional cluster manager devices and additional ICC bus lines. What would be desirable, therefore, is a method and apparatus for increasing the routing bandwidth of interrupts between cluster manager devices in a clustered multiprocessor system without significantly increasing the overhead of the system.

SUMMARY OF THE INVENTION

The present invention overcomes many of the disadvantages of the prior art by providing a method and apparatus for increasing the routing bandwidth of interrupts between cluster manager devices in a clustered multiprocessor system without significantly increasing the overall overhead of the system. This can be accomplished by providing special cluster manager devices that can convert "N" serial messages received from a local APIC to "M" parallel messages, wherein M is less than N. The special cluster manager device then transfers the "M" parallel messages to a receiving cluster manager device. The receiving cluster manager device then converts the "M" parallel messages into the original "N" serial messages, and sends the "N" serial messages to the appropriate local APIC within the receiving cluster. By using this approach, the routing bandwidth between cluster manager devices may be significantly improved. Also, the conventional ICC bus protocol interface is maintained for all local APIC devices.

In one illustrative embodiment, the present invention is incorporated into a multiprocessor data processing system that has two or more processing clusters, wherein each cluster has one or more processor, and each processor has an interrupt controller associated therewith. Each cluster may further have a cluster manager, wherein the interrupt controllers associated with each of the processors in the cluster communicate with the corresponding hierarchical cluster manager using a first messaging format over a first bus. In a preferred embodiment, the first bus is an ICC bus, as described above. Each cluster manager then communicates with selected other cluster managers via a second messaging format, preferably over one or more second busses, a switching network or other communication means.

Each cluster manager preferably has a first format converter for converting the first messaging format into the second messaging format, wherein the second messaging format requires less transfer time than the first messaging format. In addition, each cluster manager preferably has a first transferring mechanism for transferring the message in the second messaging format to the appropriate receiving cluster manager(s). Moreover, each cluster manager preferably includes a second format converter for converting the received message in the second message format to a message in the first message format. Finally, each cluster manager preferably includes a second transferring mechanism for transferring the message in the first message format to the appropriate interrupt controller(s) in the receiving cluster.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 5 is a table showing the bus cycle format for a short type message over the ICC bus;

FIG. 8 is a table showing a preferred request format for Interrupt Requests forwarded by the TCT, across the MT bus, and to the MSU via the MI bus;

FIG. 9 is a table showing a preferred data packet format for an interrupt data packet that follows the Interrupt Request of FIG. 8;

FIG. 10A is a table showing a preferred interrupt response format for a directed type Interrupt Response provided by the MSU to the destination TCT;

FIG. 10B is a table showing a preferred interrupt response format for a broadcast type Interrupt Response provided by the MSU to the appropriate destination TCTs;

FIG. 11 is a table defining selected bits of the Interrupt Response formats of FIGS. 10A–10B.

DETAILED DESCRIPTION OF THE PREFERRED EMBODIMENTS

The present invention provides a method and apparatus for increasing the routing bandwidth of interrupts between cluster manager devices in a clustered multiprocessor system. In an illustrative embodiment, this is accomplished by providing special cluster manager devices that convert "N" serial messages received from a local APIC to "M" parallel messages, wherein M is less than N. The special cluster manager device transfers the "M" parallel messages to a receiving or destination cluster manager device. The receiving or destination cluster manager device then converts the "M" parallel messages into the original "N" serial messages, and sends the "N" serial messages to the appropriate local APIC within the receiving cluster. By using this approach, the routing bandwidth between cluster manager devices may be significantly improved, while maintaining the conventional ICC bus protocol interface for all local APIC devices.

Figure 1:
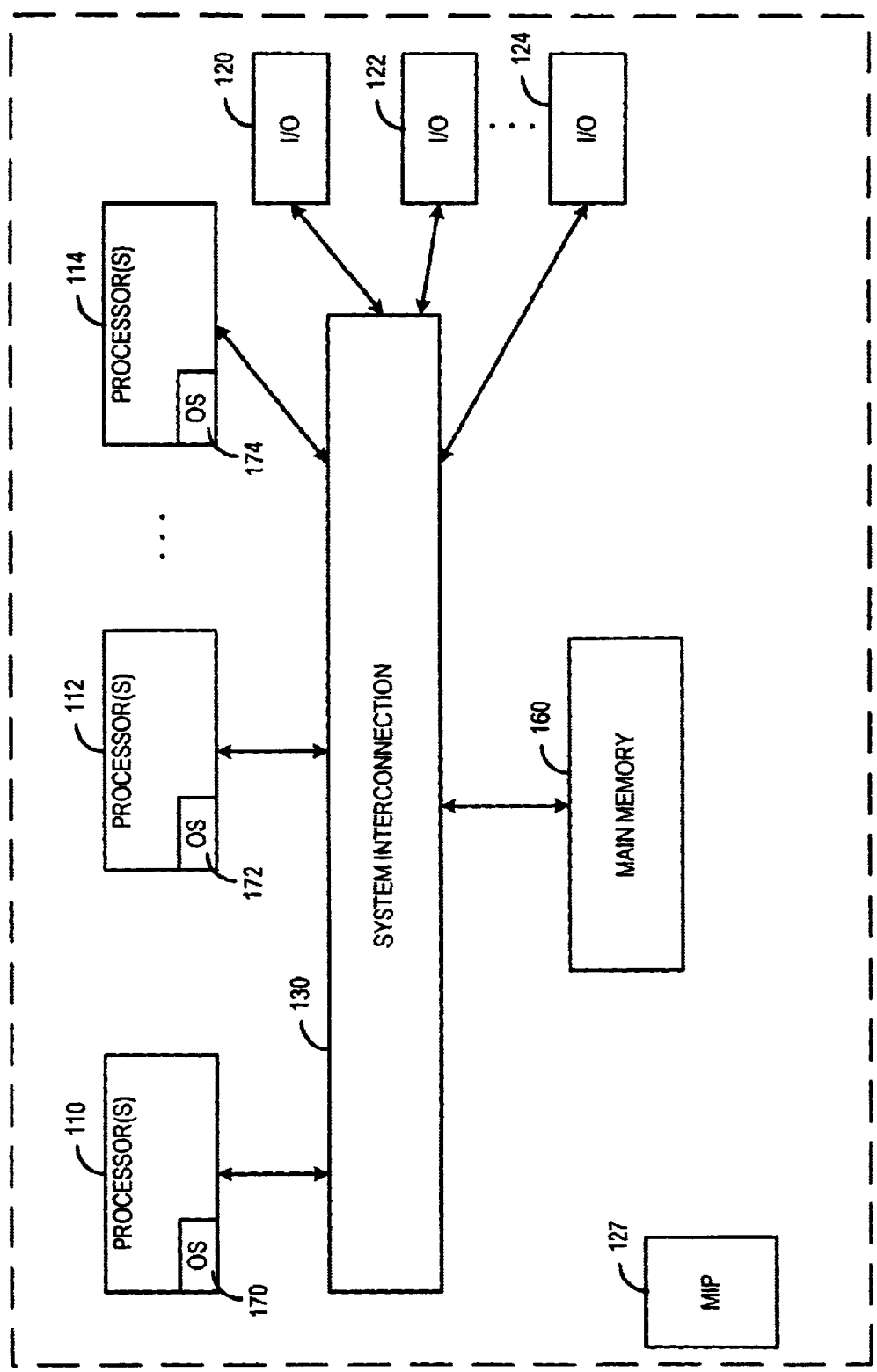
FIG. 1 is a block diagram of a multi-processor system in accordance with the present invention.

FIG. 1 is a block diagram of a multi-processor system in accordance with an illustrative embodiment of the present invention. The multi-processor system includes processor modules 110, 112, and 114. Although processor modules 110, 112 and 114 are preferably of comparable compatibility, it is contemplated that heterogeneous processors and/or operating systems may co-exist.

The processor modules 110, 112 and 114 each preferably include a plurality of processors. Two or more of the processor modules 110, 112 and 114 also share access to main (or global) memory 160 and/or I/O devices 120, 122, and 124, preferably through a system interconnection mechanism, such as system interconnection 130. Processor modules 110, 112, and 114 preferably communicate with each other through main memory 160 (by messages and status information left in common data areas).

One or more processor modules may be configured as a separate partition within the computer system, such that multiple partitions may exist within the multiprocessor computer system. Each partition may then operate under the control of a separate operating system. For example, each processor module 110, 112 and 114 of FIG. 1 can be defined as a separate partition, controlled via a separate operating system 170, 172 and 174. Each operating system 170, 172 and 174 preferably views main memory separately as though each is the only entity accessing main memory 160. A maintenance interface processor (MIP) 127 may be provided for providing hardware support and other low level functions to the system.

Figure 2:
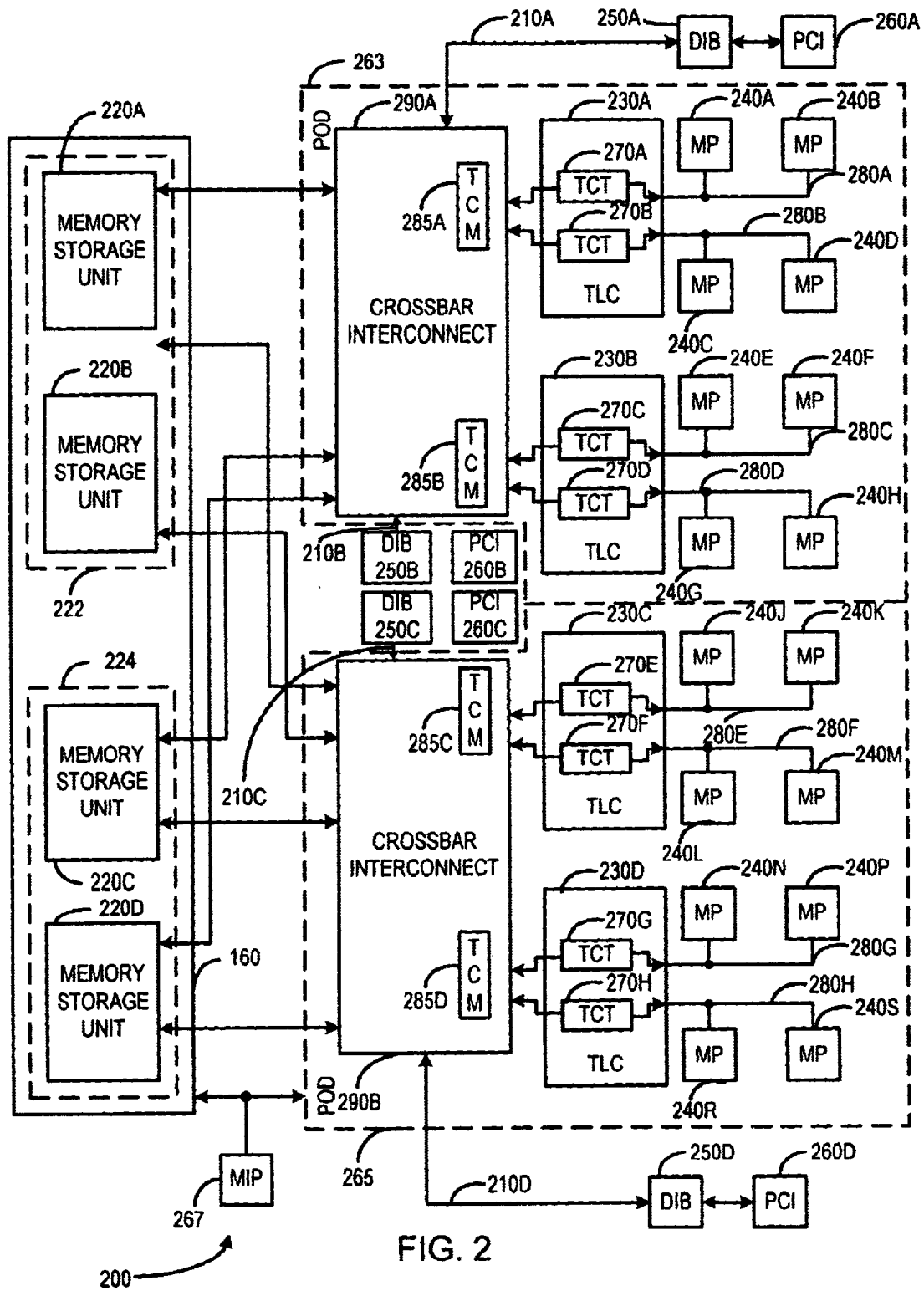
FIG. 2 is a more detailed block diagram of the multi-processor system of FIG. 1.

FIG. 2 is a more detailed block diagram of the multiprocessor system of FIG. 1. The multiprocessor system includes a main memory, illustrated here as main memory 160, and a plurality of processing modules 240 connected to the main memory via respective third level cache modules 230 and crossbar interconnects 290. A first POD 263 includes crossbar interconnect 290A, third level cache modules 230A and 230B, and processors 240A–H. A second POD 265 includes crossbar interconnect 290B, third level cache modules 230C and 230D, and processors 240J–S. In this configuration, the processing modules and the main memory are arranged in a symmetrical multiprocessing architecture, i.e., processor-to-memory latency is the same for each processing module across all of the main memory.

Main memory 160 is preferably a directory-based memory system and is capable of supporting various memory consistency models. Main memory 160 includes a plurality of memory storage units (MSUS) 220, such as memory storage units 220A, 220B, 220C, and 220D. Preferably, each memory storage unit 220A, 220B, 220C, and 220D includes as much as sixteen gigabytes of memory. Also, each memory storage unit 220A, 220B, 220C, and 220D preferably includes sixteen semi-independent banks that share four double-wide data busses and eight unidirectional address busses.

The plurality of third level cache modules 230A through 230D each include two third level cache application specific integrated circuits (e.g. TCT 270A and TCT 270B). Each TCT 270 performs address relocation, reclamation, and translation for memory addresses issued by the processors to which it is connected, as described in co-pending commonly assigned U.S. patent application Ser. No. 09/215,424, entitled "Computer System and Method for Operating Multiple Operating Systems in Different Partitions of the Computer System and for Allowing the Different Partitions to Communicate with One Another Through Shared Memory", now U.S. Pat. No. 6,314,501, which is incorporated herein by reference.

Each third level cache module 230A through 230D is connected to respective processors (MPs) 240A through 240S, as shown. Specifically, in the present embodiment, each TLC 230 is connected to four processors. Each TLC 230 and its respective four processors define a Sub-Pod. Two sub-Pods are connected via a crossbar interconnect (e.g., crossbar interconnect 290A or 290B) to form a Pod. Thus, in the embodiment shown, there are four sub-Pods connected via crossbar interconnects 290A and 290B, respectively, to form two Pods 263 and 265.

Crossbar interconnects 290A and 290B employ a crossbar memory approach, whereby a plurality of cross points are placed at intersections between the processors 240 and memory storage units 220. Within the cross point is a switch that determines the path from a particular processor bus 280 to a particular memory storage unit 220. Each switch point has control logic to set up the transfer path between a processor 240 and main memory 160. The control logic examines the address that is placed on processor bus 280 to determine which memory storage unit 220 is being addressed. The control logic also resolves multiple requests for access to the same memory storage unit 220 on a predetermined priority basis.

Each crossbar interconnect 290 further comprises a pair of Third-Level-Cache Memory Interface application specific integrated circuits (TCM) 285, which perform address relocation, reclamation, and translation for memory requests from I/O devices, as described in co-pending commonly assigned U.S. patent application No. 09/215,422 entitled "Computer System and Method for Operating Multiple Operating Systems in Different Partitions of the Computer System and for Allowing the Different Partitions to Communicate with one Another Through Shared Memory", which is incorporated herein by reference.

Computer system 200 further includes I/O buses 210A through 210D and a plurality of peripheral component interconnects (PCIs), such as PCIs 260A through 260D that are connected via direct 10 bridges, such as direct IO bridges (DIB) 250A through 250D. In operation, memory storage units 220 bi-directionally communicate with third level cache modules 230, through crossbar interconnects 290. Crossbar interconnects 290 bi-directionally communicate with direct IO bridges 250 via I/O buses 210, and with processors 240 through TCTs 270. Direct I/O bridges 250 bi-directionally communicate with peripheral component interconnects 260.

The processors (MPs) 240A–240S are preferably Intel brand processors (e.g., Pentium II Xeon, Pentium III Xeon, Merced), Unisys E-mode style processors (used in Unisys A Series and Clearpath HMP NX enterprise servers), or Unisys 2200 style processors (used in Unisys 2200 and Clearpath HMP IX enterprise servers). Preferably, a given Sub-Pod employs four processors of the same type. However, it is contemplated that different Sub-Pods may employ different types of processors. For example, one Sub-Pod may employ four Intel brand processors, while another Sub-Pod may employ four Unisys E-mode style processors.

In such a configuration, the Sub-Pod that has Intel brand processors may be defined as one partition and may run under the control of an Intel-compatible operating system, such as Unix or Windows NT, while the Sub-Pod that employs Unisys E-mode style processors may be defined as another partition and may run under the control of the Unisys MCP operating system. As yet another alternative, the Sub-Pods in two different partitions may both employ Intel processors, but one partition may run under the control of an Intel compatible operating system (e.g., Windows NT), while the other partition may run under the control of the Unisys MCP operating system through emulation of the Unisys A Series computer architecture on the Intel processors in that partition. A maintenance interface processor (MIP) 267 may be provided for providing hardware support and other low level system functions.

Figure 3:
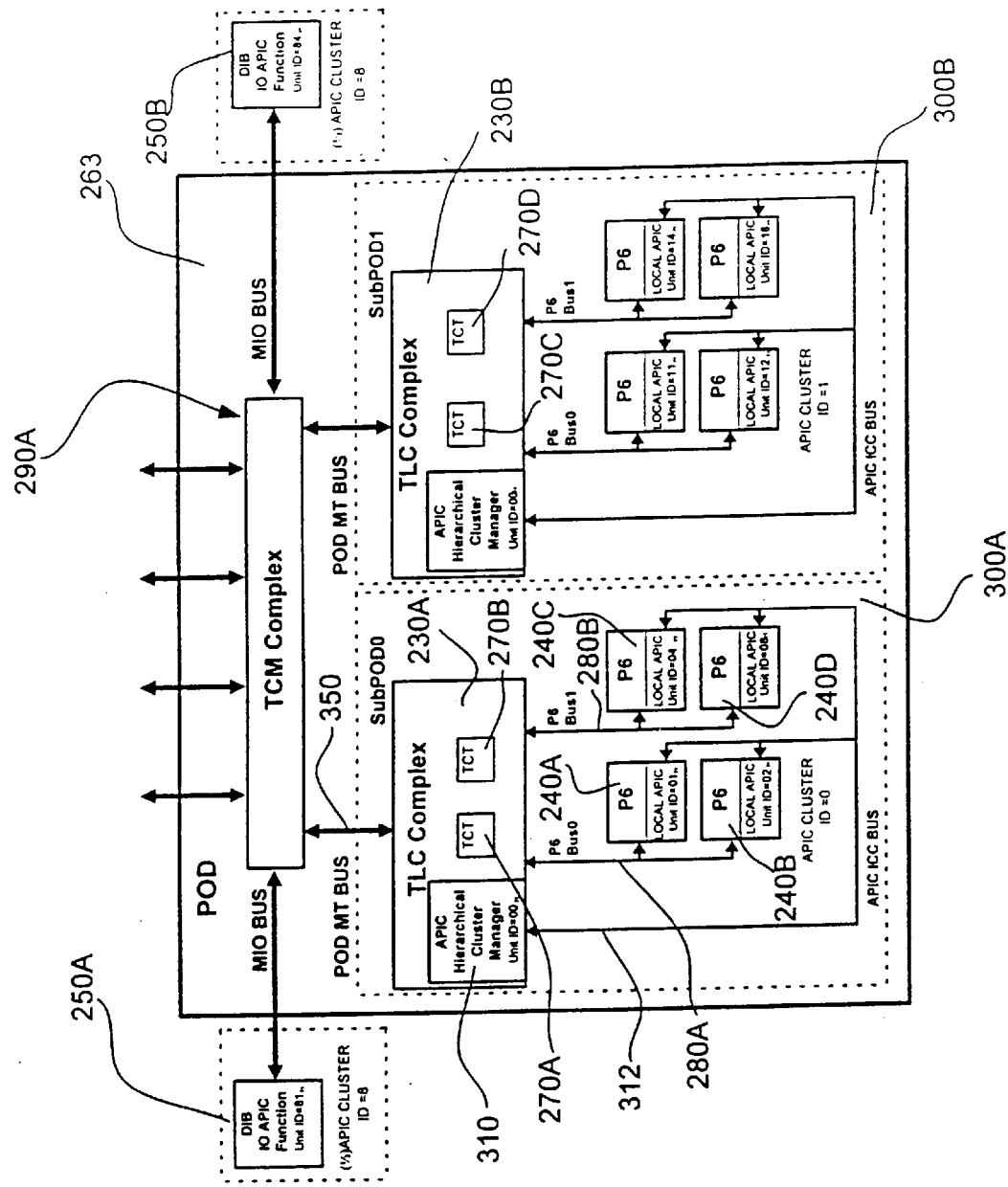
FIG. 3 is a block diagram of one of the PODs of FIG. 2.

FIG. 3 is a more detailed block diagram of Pod 263 of FIG. 2. Pod 263 includes a first sub-Pod 300A and a second sub-Pod 300B. Sub-Pod 300A preferably includes four processors 240A–240D. Processors 240A–240B are shown connected to third level cache 230A via a first front side bus 280A. Likewise, processors 240C–240D are shown connected to the third level cache 230A via a second front side bus. Two front side buses 280A and 280B are provided to increase the throughput between the processors 240A–240D and the third level cache module 230A. Sub-Pod 300B is similarly constructed.

Each processor preferably includes a local interrupt controller, as shown. When the processors are Intel brand processors, the local interrupt controller may be an Intel Advanced Programmable Interrupt Controller (APIC). All local APIC Controllers within a Sub-Pod are preferably connected to a hierarchical cluster manager 310 via a single Interrupt Controller Communications (ICC) bus 312. Thus, the multiprocessor system of FIGS. 2–3 preferably is compatible with the hierarchical cluster model delivery mode described in the Intel Multiprocessor (MP) specification (version 1.4), and is not compatible with the flat model delivery mode.

The local APIC controllers can communicate with all other APIC controllers within the Sub-Pod via the ICC bus 312. The local APIC controllers can communicate with other APIC controller in other Sub-Pods via the local ICC bus in conjunction with a hierarchical cluster manager 310. Preferably, the hierarchical cluster manager identifies the target sub-pod from the message, checks to make sure that the message transfer is allowed under the current system configuration, and passes the message to the hierarchical cluster manager of the target Sub-Pod if such a transfer is allowed.

The multiprocessor system of FIGS. 2–3 has a maximum configuration of four Pods 263, where each Pod has two sub-Pods 300A and 300B. Therefore, in the maximum configuration, the multi-processor system may include (4 Pods)*(8 processors per Pod)=32 processors. This system can preferably be partitioned on any combination of Pod or Sub-Pod boundaries, and multiple partitions may exist within the system. Each partition may operate under the control of a separate operating system. A further discussion of the multiprocessor system shown and described with reference to FIGS. 2–3 can be found in the above-referenced co-pending patent applications.

Figure 4:
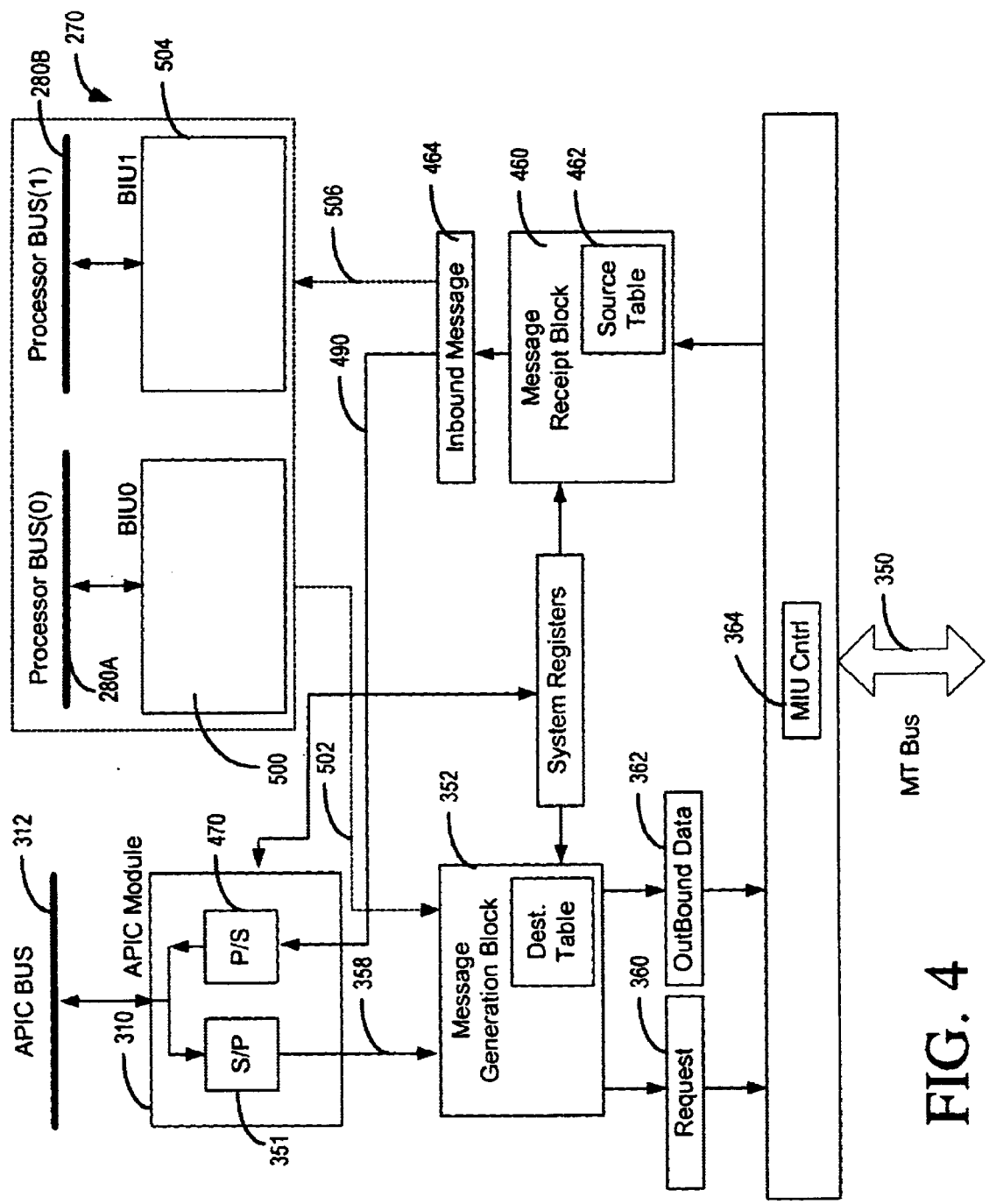
FIG. 4 is a block diagram of one of the TCT blocks of FIG. 3 along with an APIC Hierarchical Cluster Manager.

FIG. 4 is a block diagram of one of the TCT blocks of FIG. 3 along with an APIC Hierarchical Cluster Manager. As shown in FIG. 3, all local APIC Controllers within a Sub-Pod are connected to a corresponding hierarchical cluster manager 310 via a single Interrupt Controller Communications (ICC) bus 312. The local APIC Controllers within a Sub-Pod all communicate with each either via the common ICC bus 312. To communicate with APIC Controllers outside of the Sub-Pod, the local processor APIC Controllers must interface with their corresponding hierarchical cluster manager 310.

Referring specifically to FIG. 4, the hierarchical cluster manager 310 includes a serial-to-parallel conversion block 351 and a parallel-to-serial conversion block 470. The serial-to-parallel conversion block 351 receives selected serial messages over the APIC bus 312, and converts the serial messages to a parallel message format. The parallel-to-serial conversion block 470 receives parallel messages from the Message Receipt Block 460, and provides a corresponding serial message to the local processor APIC controllers via the APIC bus 312.

As indicated above, the APIC bus 312 typically handles three types of messages including EOI type messages which consume 14 ICC bus cycles, short type messages which consume 21 ICC bus cycles, and non-focused lowest priority type messages which consume up to 34 ICC bus cycles. FIG. 5 is a table showing the serial bus cycle format for the short type message. The APIC bus 312 is preferably an ICC bus, which has two lines. For the short message type, twenty-one (21) individual messages are transferred during the twenty-one bus cycles. Collectively, these twenty-one individual messages form a number of fields including the arbitration ID field (ArbID3:ArbID0), the destination mode field (DM), the delivery mode field (M2:M0), the level field (L), the trigger mode field (Tm), the interrupt vector (V7:V0), the destination address (D7:D0), a checksum field (C), and two status fields (A,A1). The serial-to-parallel conversion block 350 converts the short type message into a parallel message format. A preferred parallel message is shown in FIG. 7.

Figure 7:
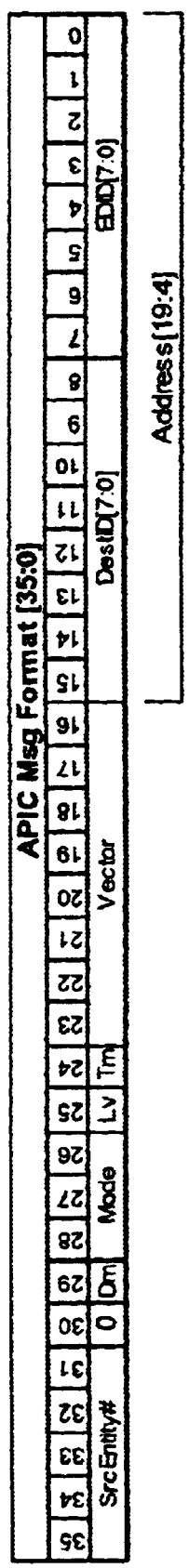
FIG. 7 is a table showing a preferred parallel message format produced by the serial-to-parallel converter of FIG. 6.

Referring to FIG. 7, the arbitration ID field, the checksum fields and the two status fields of the short type message shown in FIG. 5 are stripped off, and only the destination mode field (DM), the delivery mode field, the level field, the trigger mode field, the interrupt vector, and the destination address are included in the parallel message. The checksum fields and the two status fields are used to verify the status of the serial transmission across the APIC bus 312.

Using values stored in system registers, an extended destination ID field (EDID) and a source entity (SrcEntity#) field are also added, as shown in FIG. 7. The extended destination ID field (EDID) is set to all zeros when the Sub-Pod uses IA-32 type processors, and may be non-zero when IA-64 type processors are used. The source entity (SrcEntity#) field identifies the processor that issued the interrupt, and is only included for error handling purposes in the event the interrupt message is not properly delivered. An agent table may also be provided to verify that the destination processor specified in the destination ID field is an allowed message destination in the current system configuration (such as resides in the same partition).

Referring back now to FIG. 4, once the interrupt message is converted into the parallel message format, the message is forwarded to Message Generation Block 352. Using a lookup table, such as Destination Table 354, the Message Generation Block 352 builds an Interrupt Request and an Interrupt Data Packet. A preferred Interrupt Request is shown in FIG. 8, and a preferred Interrupt Data Packet is shown in FIG. 9.

The Interrupt Request typically includes routing information used to route the message through the system and to the proper destination processor. Referring to FIG. 8, the MVEC field identifies the destination POD, the R_BUS field identifies the destination Sub-Pod, and the P_BUS field identifies the destination processor bus. The remaining fields are used to notify the system if, for example, the message has an associated data packet (DP), which partition the message is associated (WID), whether the message is a response to a previous issued request (Drsp), whether the message should be broadcast to more than one processor in the partition (Bcast), etc. These field are further discussed below with reference to FIG. 11.

As shown in FIG. 9, the Data Packet that is built by the Message Generation Block 352 includes eight 32-bit words. Many of the fields are not used for transferring an Interrupt Message between IA-32 type processors. However, word four (4) of the Data Packet preferably includes the Tm, Lv, Dm, Mode and Vector fields provided by the initial serial APIC message. The ReqA and ReqB fields are only used when IA-64 type processors are used.

Once generated, the Interrupt Request and associated Data Packet are buffered in Request buffer 360 and Outbound Data Queue 362, respectively. When the MIU Control Block 364 obtains access to the MT bus 350, the Interrupt Request is forwarded to the TCM Complex 290. When the TCM Complex 290 obtains access to the proper MI bus, the TCM complex 290 forwards the Request to the proper MSU block 220 (see FIG. 2). The associated Data Packet follows the corresponding Interrupt Request.

After receiving the Interrupt Request and associated Data Packet, the corresponding MSU block 220 generates a two-cycle response. FIG. 10A is a table showing a preferred Interrupt Response format for a directed type Interrupt, and FIG. 10B is a table showing a preferred Interrupt Response format for a broadcast type Interrupt. The directed type Interrupt is typically directed to a particular TCM, while the broadcast type Interrupt is typically directed to more than one TCM. The destination TCM's are identified by the MVEC field of the Interrupt Request.

Once the destination TCM receives the Interrupt Response, the TCM uses the R_BUS field to identify the proper Sub-Pod. The Interrupt Response and the associated Data Packet are then forwarded to the appropriate Sub-Pod, and more specifically, to the proper destination TCT within the Sub-Pod. Referring again to FIG. 4, after the MIU Control block 364 of the destination TCT gains access to the MT bus 350, the TCT reads the Interrupt Response and associated Data Packet from the TCM, and provides the Interrupt Response and associated Data Packet to the corresponding Message Receipt Block 460.

The Message Receipt Block 460 checks a Source Table 462 to determine if the Interrupt source is valid. For example, the Source Table 462 may be used to determine when the source of the interrupt and the destination of the interrupt are not in the same partition, which typically is not allowed. Once the validity of the interrupt is verified, the Message Receipt Block 460 builds an Interrupt Message, preferably in accordance with FIG. 7, and forwards the resulting message to parallel-to-serial conversion block 470. Parallel-to-serial conversion block 470 converts the Interrupt Message into a serial message, and forwards the message to the appropriate local APIC via the APIC bus 312.

Figure 6:
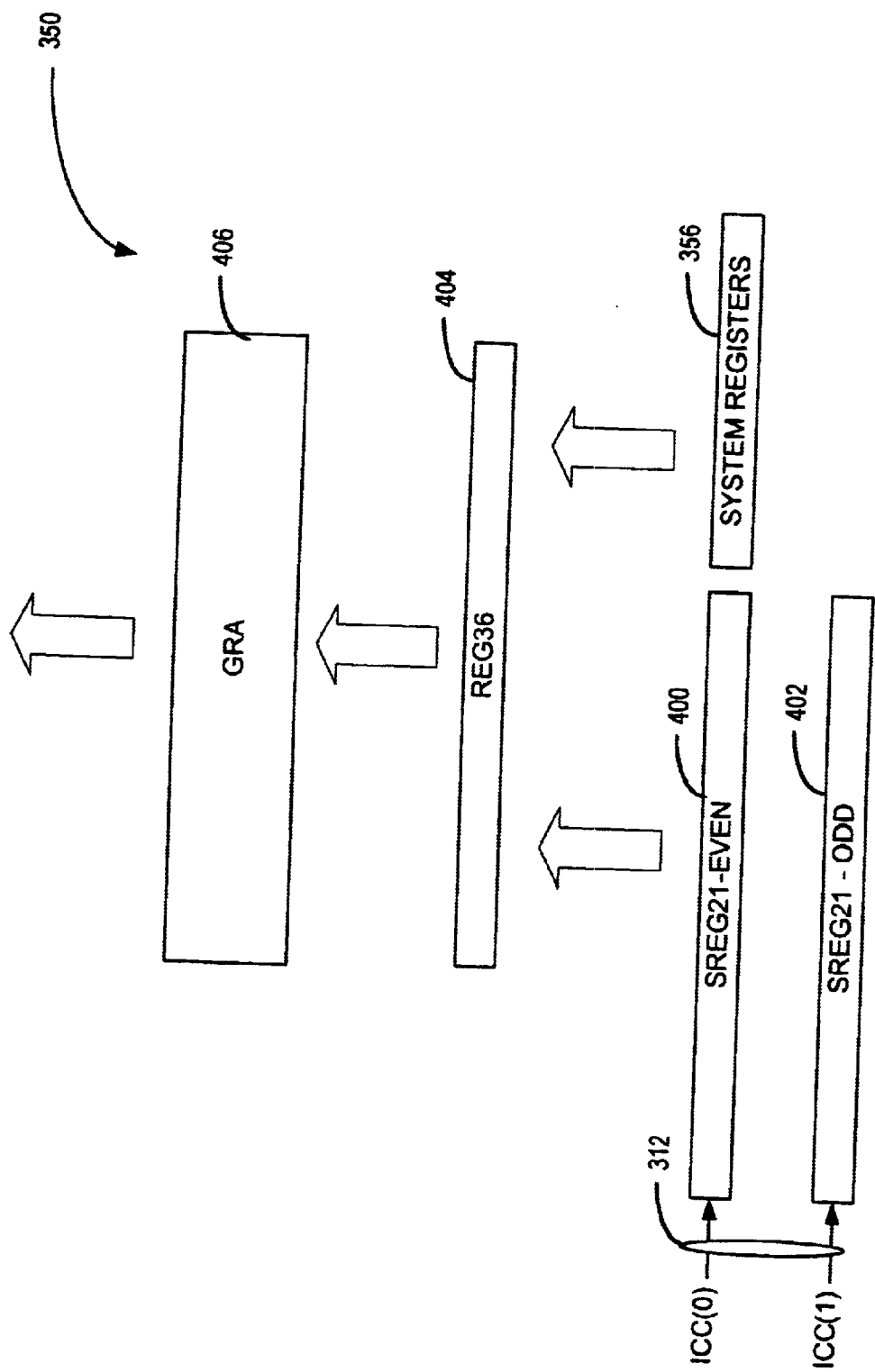
FIG. 6 is a block diagram showing an illustrative serial-to-parallel converter for converting the serial ICC message to a parallel message format shown in FIG. 7.

FIG. 6 is a block diagram showing an illustrative serial-to-parallel converter for converting the serial ICC message received over the APIC bus 312 to the parallel message format shown in FIG. 7. As indicated above, the APIC bus 312 preferably includes two lines. One of the lines is connected to the input of a first shift register SREG21 400, and the other of the two lines is preferably connected to the input of a second shift register SREG21 402.

When receiving serial ICC messages over the APIC bus 312, the shift registers 400 and 402 are shifted once for each bus cycle, thereby capturing the messages provided across the serial APIC bus 312. During a short type message, for example, the first shift register SREG21 400 and the second shift register SREG21 402 may capture the bits sent on the two bus lines of the APIC bus 312 during each of the 21 bus cycles (see FIG. 5). After all of the messages of a given interrupt are captured by the first and second shift registers 400 and 402, the serial-to-parallel converter 350 reads the values stored in the first and second shift registers 400 and 402, and builds a parallel message, preferably in accordance with the parallel message format shown in FIG. 7.

Some of the fields in the parallel message of FIG. 7 may be provided by values stored in selected system registers 356. For example, the source entity field (SrcEntity#) and the extended ID field (EDID) may be provided by system registers 356. The resulting parallel message is preferably stored in a staging register 404, and subsequently passed to a message queue (GRA) 406 before transfer to the Message Generation Block 352.

Figure 12:
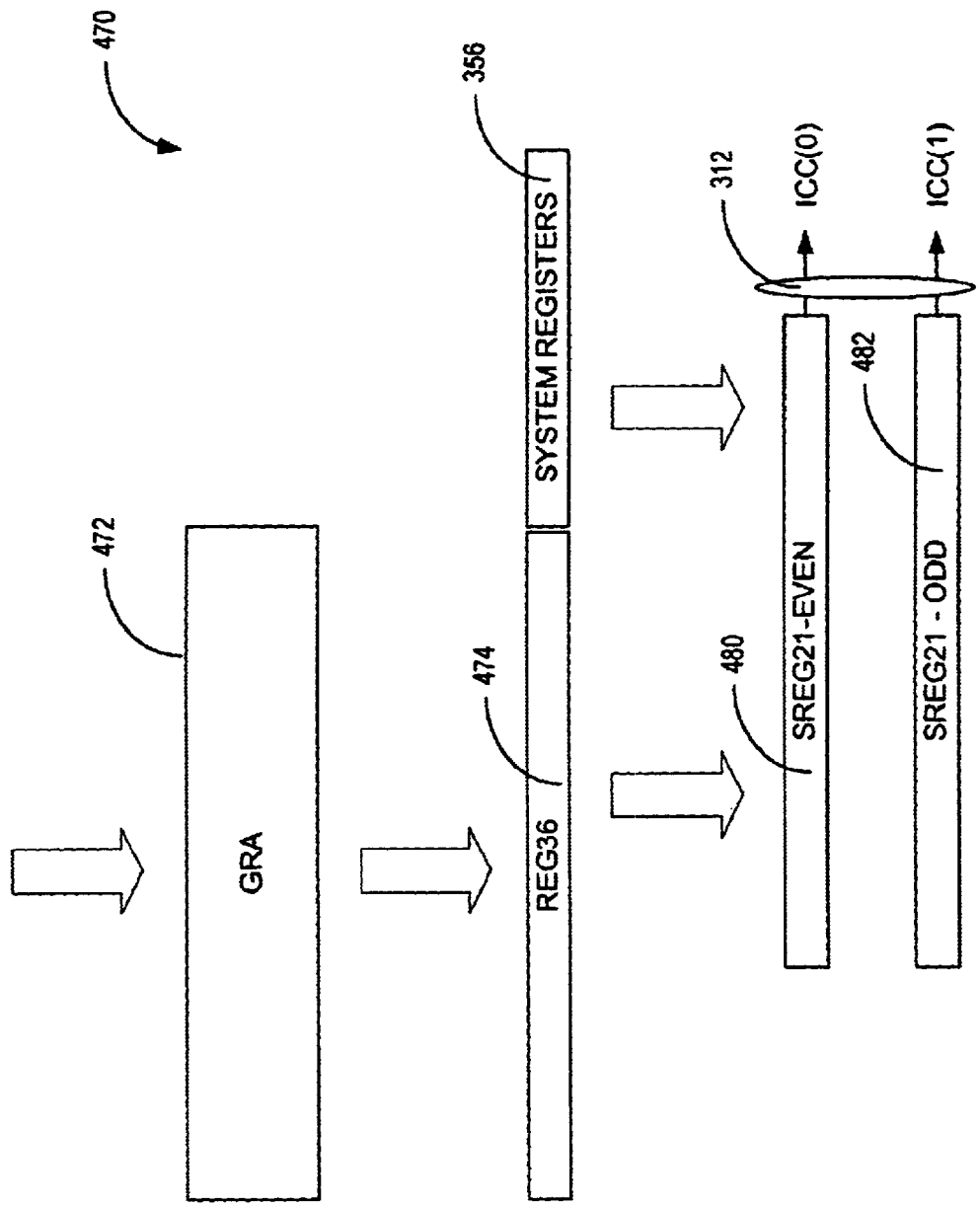
FIG. 12 is a block diagram showing an illustrative parallel-to-serial converter for converting the parallel message of FIG. 7 to a serial ICC message.

FIG. 12 is a block diagram showing an illustrative parallel-to-serial converter 470 for converting the parallel message provided by the Message Receipt Block 460 to a serial message compatible with the APIC bus 312. As indicated above, the Message Receipt Block 460 provides a parallel message to the parallel-to-serial converter block 470 via interface 490. The parallel message may be in the format shown and described with reference to FIG. 7. The message is first provided to message queue (GRA) 472. When access to the APIC bus 312 is granted, one of the messages stored in the message queue 472 is passed to register 474. Once in register 474, the parallel-to-serial converter 470 builds two strings of bits, each corresponding to one of the lines of the APIC bus 312. One of the strings is stored in shift register 480, and the other string is stored in shift register 482. The output of shift register 480 is connected to one of the bus lines of the APIC bus 312, and the output of shift register 482 is connected to the other bus line.

Some of the bits that are provided to shift registers 480 and 482 may be provided by system registers 356. For a short type message, for example, the arbitration ID bits (ArbID3:0) may be provided by system registers 356. Likewise, the checksum and status cycle bits may be calculated or generated by the parallel-to-serial converter 470, and provided to shift registers 480 and 482.

When IA-64 type processors are used, the APIC bus 312 is no longer used to transmit interrupts. Rather, the interrupts are passed directly to the processors via the processor's data and address busses. In such a configuration, the Message Generation Block 352 preferably receives an interrupt directly from one of the bus interface units 500 and 504, via interface 502. The Message Generation Block 352 may then extract the necessary information from the interrupt message, and built an Interrupt Request and Interrupt Data Packet, in the same format as described above and as shown in FIG. 7. The message is then transferred to the destination TCT in the same manner as described above.

Once the message arrives at the destination TCT, the Message Receipt Block 460 provides an interrupt message that can be directly applied to the processor's busses. In doing so, the Message Receipt Block 460 extracts several fields from the Data Packet (see FIG. 9), including the Request phase-A (ReqA) address, the Request phase-B (ReqB) address, the interrupt vector, the byte enable (BE) bits, etc., and builds an input vector that can be directly applied to the processor busses via the Bus Interface Units (BIU) 500 and 504. Once built, the resulting interrupt message is forwarded to the proper destination processor(s) via the BIUs 500 and 504.

Having thus described the preferred embodiments of the present invention, those of skill in the art will readily appreciate that the teachings found herein may be applied to yet other embodiments within the scope of the claims hereto attached.

What is claimed is:

1. A multiprocessor data processing system comprising:
    a first processing cluster having a first cluster manager and one or more first processors, wherein each of the first processors has an associated interrupt controller;
    a second processing cluster having a second cluster manager and one or more second processors, wherein each of the second processors has an associated interrupt controller;
    first messaging means for providing communication between the interrupt controllers of the first processing cluster and the first cluster manager;
    second messaging means for providing communication between the first cluster manager and the second cluster manager;
    first converting means for converting N messages provided over said first messaging means into M message(s), wherein M is less than N; and
    first transferring means for transferring the M message(s) to the second cluster manager via said second messaging means.

2. A multiprocessor data processing system according to claim 1, further comprising:
    second converting means for converting the M message(s) received via the second messaging means into N messages; and
    second transferring means for transferring the N messages to one or more of the interrupt controllers of the second processing cluster.

3. A multiprocessor data processing system according to claim 2, wherein said first messaging means includes an Interrupt Controller Communications (ICC) bus, and said second messaging means includes a cross-bar interface.

4. A multiprocessor data processing system according to claim 3, wherein a transfer of an interrupt across the Interrupt Controller Communications (ICC) bus requires N serial messages that are transmitted during N or more ICC bus cycles.

5. A multiprocessor data processing system according to claim 4, wherein said first converting means converts the N messages received over said Interrupt Controller Communications (ICC) bus into M message(s), and said first transferring means transfers the M message(s) to the second cluster manager via said cross-bar interface.

6. A multiprocessor data processing system according to claim 5, wherein said second converting means converts the M message(s) received via the cross-bar interface into N messages, and said second transferring means transfers the N messages to one or more of the interrupt controllers of the second processing cluster via the Interrupt Controller Communications (ICC) bus.

7. A multiprocessor data processing system comprising:
    a first processing cluster having a first cluster manager and one or more first processors, wherein each of the first processors has an associated interrupt controller;
    a second processing cluster having a second cluster manager and one or more second processors, wherein each of the second processors has an associated interrupt controller;
    a serial interface for providing communication between the interrupt controller of the first processing cluster and the first cluster manager;
    a parallel interface for providing communication between the first cluster manager and the second cluster manager;
    first converting means for converting serial messages received via said serial interface into one or more parallel messages; and
    first transferring means for transferring the one or more parallel messages from said first processing cluster to said second processing cluster via said parallel interface.

8. A multiprocessor data processing system according to claim 7, further comprising:
    second converting means for converting the one or more parallel messages received via the parallel interface into a serial message; and
    second transferring means for transferring the serial message to one or more of the interrupt controllers of the second processing cluster via another corresponding serial interface.

9. A multiprocessor data processing system comprising:
    a first processing cluster having a first cluster manager and one or more first processors, wherein each of the first processors has an associated interrupt controller;

a second processing cluster having a second cluster manager and one or more second processors, wherein each of the second processors has an associated interrupt controller;

first messaging means for providing communication between the interrupt controller of the first processing cluster and the first cluster manager;

second messaging means for providing communication between the first cluster manager and the second cluster manager;

first converting means for converting one or more original messages provided via said first messaging means into one or more converted message, wherein the one or more converted messages have a different format than the one or more original messages; and first transferring means for transferring the one or more converted messages to the second cluster manager via said second messaging means.

10. A multiprocessor data processing system according to claim 9, further comprising:

second converting means for converting the one or more converted messages received via the second messaging into the one or more original messages; and second transferring means for transferring the one or more original messages to one or more of the interrupt controllers of the second processing cluster.

11. A method for transferring an interrupt from a first processor in a first cluster of a multiprocessor data processing system to a second processor in a second cluster of the multiprocessor data processing system, wherein each cluster including one or more processor with each processor has an interrupt controller associated therewith, each cluster further having a cluster manager, with the interrupt controllers of the corresponding processors communicating with the corresponding cluster manager via a first interface, and the cluster managers communicating with selected other cluster managers via a second interface, the method comprising the steps of:

providing an interrupt from the first processor to the corresponding interrupt controller;

providing N serial messages that correspond to the interrupt onto the corresponding first interface;

receiving the N serial messages at the corresponding cluster manager;

converting the N serial messages into M parallel messages, wherein M is less than N; and transferring the M parallel messages to another cluster manager via said second interface.

12. A method according to claim 11, wherein N is two or more.

13. A method according to claim 12, where M is one.

14. A method according to claim 11, further comprising the steps of:

receiving the M parallel messages at the other cluster manager via the second interface;

converting the M parallel messages into N serial messages; and transferring the N serial messages to the interrupt controller of the second processor via the corresponding first interface.

15. A method according to claim 14, wherein the interrupt controllers associated with selected processors are APIC interrupt controllers.

16. A method according to claim 15, wherein the first interface of selected cluster is an Interrupt Controller Communications (ICC) bus.

17. A method according to claim 16, wherein the second interface is a crossbar interface.

* * * * *